US006201755B1

(12) United States Patent
Pillar et al.

(10) Patent No.: US 6,201,755 B1
(45) Date of Patent: Mar. 13, 2001

(54) METHOD AND SYSTEM FOR STORING AND RETRIEVING INFORMATION IN A COMMUNICATIONS NODE

(75) Inventors: John Pillar; Eric Englert; Bernard St-Denis, all of Nepean (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/215,201

(22) Filed: Dec. 18, 1998

(51) Int. Cl.$^7$ .................................................. G11C 11/30

(52) U.S. Cl. .............................. 365/230.01; 365/230.03

(58) Field of Search ....................... 365/189.04, 230.01, 365/200, 189.05, 230.03, 230.06, 230.08

(56) References Cited

U.S. PATENT DOCUMENTS 4,982,379 * 1/1991 Miyata ............................ 365/230.08

* cited by examiner

*Primary Examiner*—Terrell W. Fears
(74) *Attorney, Agent, or Firm*—Finnegan, Henderson, Farabow, Garrett & Dunner, L.L.P.

(57) ABSTRACT

Methods and systems consistent with the present invention store connection information in a memory of a node in a communications network such that the number of searches for retrieving the connection information is less than a predetermined probe threshold. The node includes a hash table and a connection table in the memory for storing and retrieving information associated with packets, frames, and/or cells in the communications network. Each entry in the hash table includes a connection identifier and, for example, a connection index, and is indexed according to a hash value based on the connection identifier. Each entry in the connection table includes connection state information that is indexed according to a connection index in the hash table. To store connection information in the memory, the node identifies in the hash table a first set of addresses that correspond to a first connection identifier. When the first set of addresses does not correspond to a free entry, the node randomly selects one of the first set of addresses, and identifies a second connection identifier in an entry at the randomly selected address. The node then inserts the second connection identifier at a free one of a second set of addresses corresponding to the second connection identifier and inserts the first connection identifier at the randomly selected address.

14 Claims, 8 Drawing Sheets

METHOD AND SYSTEM FOR STORING AND RETRIEVING INFORMATION IN A COMMUNICATIONS NODE

TECHNICAL FIELD

The present invention generally relates to "connection-oriented" and "connection-less" packet, frame relay, or cell switching networks, and more particularly, to a method and system for storing and retrieving connection and/or forwarding information associated with specific identifiers contained within the packets, frames, or cells in a communications network.

BACKGROUND OF THE ART

Communication networks generally transport information in the form of packets, cells, or frames between nodes. Depending upon the particular protocol used to transport the information, a communication network may be categorized as a connection-oriented network or a connection-less network.

In a connection-oriented network, for example an Asynchronous Transfer Mode (ATM) network, the network establishes a connection for transporting cells between nodes, which may include, for example, switching systems and routers. When a node receives a cell, the node identifies a connection, for example a virtual circuit or a virtual path, associated with the cell in order to properly route the cell to the next node in the network. As a result, the node must retrieve from a memory the connection information associated with the cell within a fraction of the time for processing the cell. This task of retrieving the connection information impacts the performance of a node, especially as the address space of connection identifiers becomes large and unrestricted.

Although in a connection-less network, for example an Internet Protocol (IP) network, the network transports packets or frames without establishing connections between the nodes, the nodes identify forwarding information, for example output port addresses in the nodes, associated with packets for routing the packets to their destination nodes in the network. Like nodes in a connection-oriented network, a node in a connection-less network must retrieve the forwarding information associated with a packet within a fraction of the time for processing the packet. This task of retrieving the forwarding information impacts the performance of the node and the communications network as a whole.

Several solutions are known for storing and retrieving connection and forwarding information in connection-oriented and connection-less nodes. One solution uses a Content Addressable Memory (CAM) for storing and retrieving connection and forwarding information associated with cells and packets. CAM has a high incremental cost, however, and is not cost effective for processing large number of connections or network addresses.

Another solution uses a linear index into a Random Access Memory (RAM) for storing and retrieving information in a node. A linear index, however, requires a RAM address space that is as large as the address space for connection identifiers or addresses in a network, which can be large and unrestricted. Thus, the linear index is not a practical solution for ATM and IP networks.

Another known solution uses a hierarchical linear index into a RAM for storing and retrieving connection and forwarding information in a node. A hierarchical linear index uses a key into the RAM for retrieving the information. The key, however, must correspond to a predefined hierarchy, which puts a restriction on the allocation of connection identifiers or network addresses in the node. To maintain the hierarchy, the node must periodically restructure the hierarchy as the node inserts and deletes keys in the RAM. Restructuring the hierarchy generally requires significant resources and service interruptions unless the node reserves additional memory, which may be impractical and costly.

Yet another solution uses a binary search into a RAM for storing and retrieving connection and forwarding information in a node. The binary search uses a feedback from each search into the RAM before performing another search, and thus, significantly increases the retrieval times in the node.

Therefore, it is desirable to have a method and system for storing and retrieving connection and/or forwarding information in a communication node, and thus, to overcome the above-mentioned and other disadvantages of the prior art.

DISCLOSURE OF THE INVENTION

Methods and systems consistent with the present invention retrieve connection information from a memory in a node of a communications network by identifying in the memory a set of addresses corresponding to a connection identifier such that the number of searches for retrieving the connection information is less than a predetermined probe threshold. A node may include, for example, a switching system, a router, a bridge, and/or any other processing device in a communications network. In a connection-oriented network, for example an ATM network, a connection identifier may include a virtual circuit identifier (VCI) and/or a virtual path identifier (VPI). In such a network, the connection information may include, for example, configuration and context information associated with a virtual circuit (VC) and/or a virtual path (VP) in the ATM network.

In a connection-less network, for example an Internet Protocol (IP) network, a connection identifier may include a destination address. In such a network, the connection information may include forwarding information, for example an output port address in a node, and/or flow information, for example Quality of Service (QoS) information associated with a flow in the IP network.

In accordance with an embodiment of the invention, when a node in a communications network receives a packet, frame, and/or a cell, the node determines a first connection identifier for retrieving the connection information associated with the received cell. In a hash table, which may reside in the memory, the node identifies a first address that corresponds to the first connection identifier by, for example, determining a hash value based on the first connection identifier. The node then retrieves from that first address a first entry, which includes a second connection identifier and, for example, a connection index. Alternatively, the first entry may include a second connection identifier and, for example, connection information that corresponds to the second connection identifier.

When the first connection identifier does not match the second connection identifier, the node identifies in the hash table a second address that corresponds to the first connection identifier by determining a different hash value. The node then retrieves a second entry from the second address in the hash table. The node repeats the above steps, for example recursively, until it retrieves from the hash table an entry that includes a connection identifier that matches the first connection identifier or until a count of the entries searched in the hash table equals a predetermined probe threshold.

When the first connection identifier matches a connection identifier in an entry in the hash table, the node identifies a connection index in the matching hash table entry. The connection index includes a third address into a connection table, which may also reside in the memory. The node retrieves from the third address in the connection table the connection information associated with the first connection identifier. When the count of the entries searched in the hash table equals the predetermined probe threshold and the node has not identified a matching hash table entry, the node determines that the connection information does not exist in the connection table.

In accordance with an embodiment of the invention, when a higher-level routing system in the network requests the establishment of a connection, the node stores the connection information as follows: The node identifies in the hash table a first set of addresses corresponding to a first connection identifier by determining, for example, a set of hash values based on the first connection identifier. When one of the first set of addresses corresponds to a free entry, the node inserts at that address an entry that includes the first connection identifier and its associated connection index. It then inserts the connection information associated with the first connection identifier in the connection table at an address that corresponds to the connection index.

When the first set of addresses does not correspond to a free entry, however, the node randomly selects one of the first set of addresses. It then identifies a second connection identifier in an entry at the randomly selected address, and identifies in the hash table a second set of addresses corresponding to the second connection identifier. When one of the second set of addresses corresponds to a free entry, the node inserts at that free address an entry that includes the second connection identifier and its associated connection index, and inserts at the randomly selected one of the first set of addresses in the hash table an entry that includes the first connection identifier and its associated connection index.

When the second set of addresses also does not correspond to a free entry, the node randomly selects one of the second set of addresses, and repeats the above steps, for example recursively, until it identifies a connection identifier that corresponds to a free entry in the hash table or until a count of the randomly selected addresses equals a predetermined reinsert threshold. When the count of the randomly selected addresses equals the predetermined reinsert threshold and the node has not identified a free entry in the hash table, the node determines that the first connection identifier cannot be stored in the hash table.

When the node identifies a connection identifier that corresponds to a free entry in the hash table, however, it inserts the identified connection identifier into the hash table, replacing the identified free entry. The node then reinserts, for example, in a last-in-first-out (LIFO) sequential order each preceding identified connection identifier into the hash table at its associated randomly selected address, such that the first connection identifier is inserted at the randomly selected one of the first set of addresses. For example, the node inserts the second connection identifier at the randomly selected one of the second set of addresses, and then, inserts the first connection identifier at the randomly selected one of the first set of addresses.

Methods and systems consistent with the present invention have several advantages over the prior art. First, a node will retrieve connection information within a predetermined number of probes into the memory. Second, when a node attempts to store a first connection identifier in the memory at a randomly selected address that already includes an entry corresponding to a second connection identifier, the node reinserts the second connection identifier into another address corresponding to the second connection identifier. After reinserting the second connection identifier into the memory, the node then inserts the first connection identifier into the randomly selected address. Thus, when the node inserts the first connection identifier into the memory, the service associated with the second connection identifier is not interrupted or affected during the reinsertion step.

BEST MODE FOR CARRYING OUT THE INVENTION

The following description of embodiments of this invention refers to the accompanying drawings. Where appropriate, the same reference numbers in different drawings refer to the same or similar elements.

In accordance with an embodiment of the invention, a node in a communications network includes a hash table and a connection table in a memory for storing and retrieving information, for example connection information and/or any other type of information, associated with packets, frames, and/or cells in the communications network. Each entry in the hash table includes a connection identifier and, for example, a connection index, and is indexed according to a hash value that is based on the connection identifier. Each entry in the connection table includes connection information, for example configuration and context information that is indexed according to connection indexes in the hash table.

Alternatively, the node may include a hash table in a memory for storing and retrieving connection information associated with cells in the communications network. Each entry in the hash table may include a connection identifier and, for example, connection information that corresponds to the connection identifier.

When the node receives, for example, a cell, the node determines a connection identifier, which may include, for example, the virtual circuit identifier (VCI) and/or the virtual path identifier (VPI) in the cell header. Alternatively, when the node receives, for example, a packet, the node determines a connection identifier, which may include, for example, a destination address in the packet header.

The node computes one or more hash values based on the connection identifier, and uses each hash value as an index into the hash table. Using the index, the node retrieves from the hash table an entry that is indexed according to the index and that includes a matching connection identifier. The node identifies in the retrieved hash table entry a connection index, which includes an address of or a pointer to an entry in the connection table. The node then retrieves the connection information associated with the connection identifier from the connection table at the address included in the connection index. Alternatively, in an embodiment where the retrieved hash table entry also includes connection information associated with the connection identifier, the node retrieves the connection information directly from the retrieved hash table entry.

The connection information may include, for example, configuration and context information associated with a virtual circuit (VC) and/or a virtual path (VP) in an ATM network. Alternatively, the connection information may include forwarding information, for example an output port address in a node, and/or flow information, for example Quality of Service (QoS) information associated with a flow in an IP network.

Figure 1:
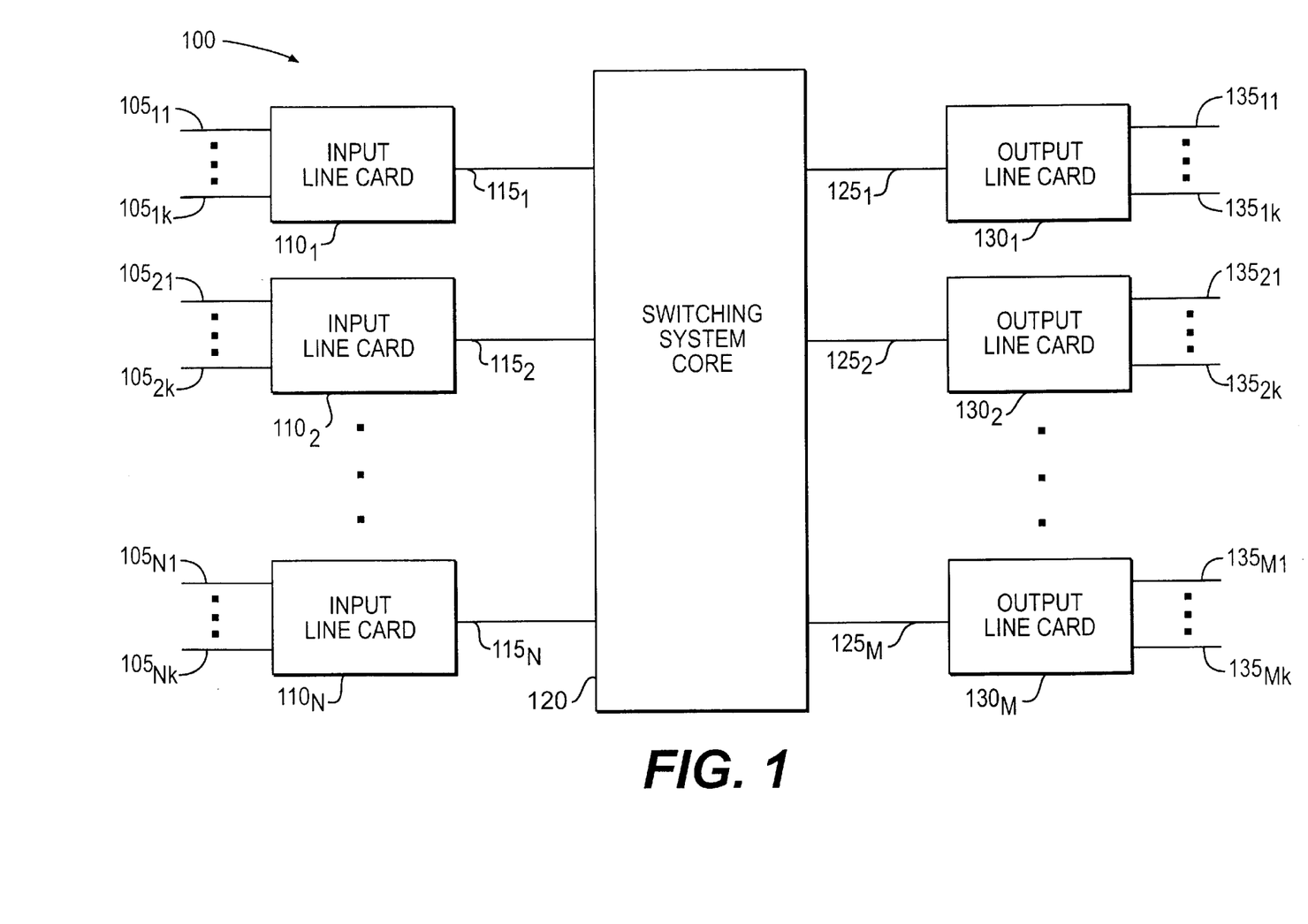
FIG. 1 is a block diagram of a node in a communications network in accordance with an embodiment of the present invention.

FIG. 1 is a block diagram of a switching system 100 in, for example, an Asynchronous Transport Mode (ATM) communications network in accordance with an embodiment of the present invention. Switching system 100 comprises N input line cards $110_1$ through $110_N$, an N×M switch core 120, and M output line cards $130_1$ through $130_M$. Input line cards $110_1$–$110_N$ each receive k input links, and connect to switch core 120 via internal links $115_1$ through $115_N$, respectively. Switch core 120 connects via internal links $125_1$ through $125_M$ to output line cards $130_1$–$130_M$, respectively, each of which interfaces k output links.

Switching system 100 receives cells via input line cards $110_1$–$110_N$, each of which identifies a connection index associated with each received cell. Switch core 120 uses the identified connection index to retrieve connection information, for example configuration (static) and context (dynamic) information, associated with each cell. The configuration and context information may include, for example, routing information and received cell counts, respectively. Switch core 120 uses the connection information to route each cell to one of output line cards $130_1$–$130_M$.

Figure 2:
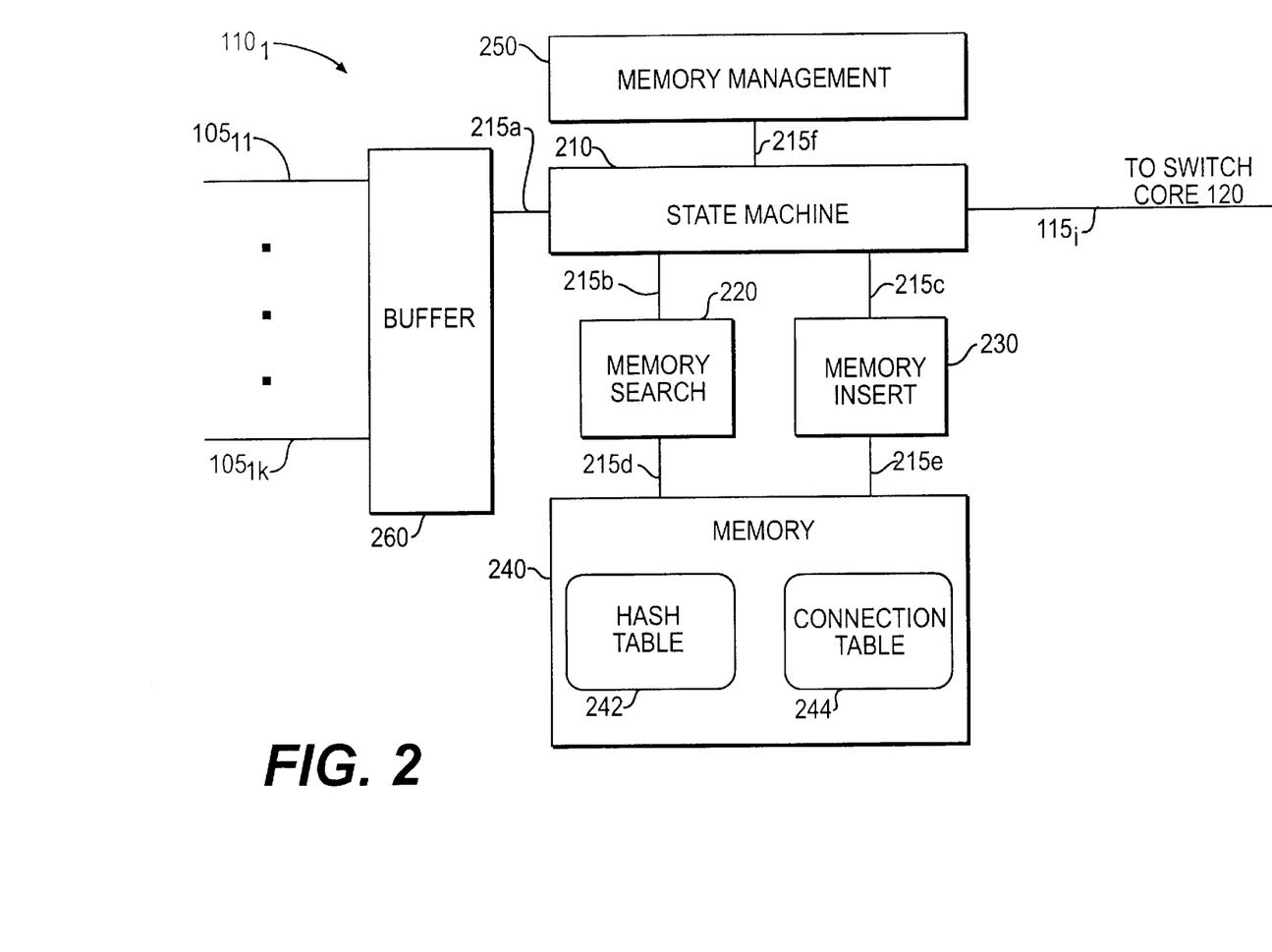
FIG. 2 is a block diagram of an input line card in a node in accordance with an embodiment of the present invention.

FIG. 2 is a block diagram of input line card $110_1$ in accordance with an embodiment of the present invention. Input line card $110_1$ comprises state machine 210, memory search module 220, memory insert module 230, memory unit 240, memory management module 250, and buffer 260. Buffer 260 receives input links $105_{1_1}$–$105_{1_k}$, and connects to state machine 210 via internal link $215a$. State machine 210 connects to switch core 120, memory search 220, memory insert 230, and memory management 250 via internal links $115_1$, $215b$, $215c$, and $215f$, respectively. Memory search 220 and memory insert 230 respectively connect to memory 240 via internal links $215d$ and $215e$.

Memory 240, which may be, for example, a Random Access Memory (RAM), includes a hash table 242 and a connection table 244. Each entry in hash table 242 includes a connection identifier and a connection index, and is indexed according to a hash value, which is based on the connection identifier. Each entry in connection table 244 includes connection information, for example static configuration and/or dynamic context information, and is indexed according to a connection index stored in the hash table.

Figure 3:
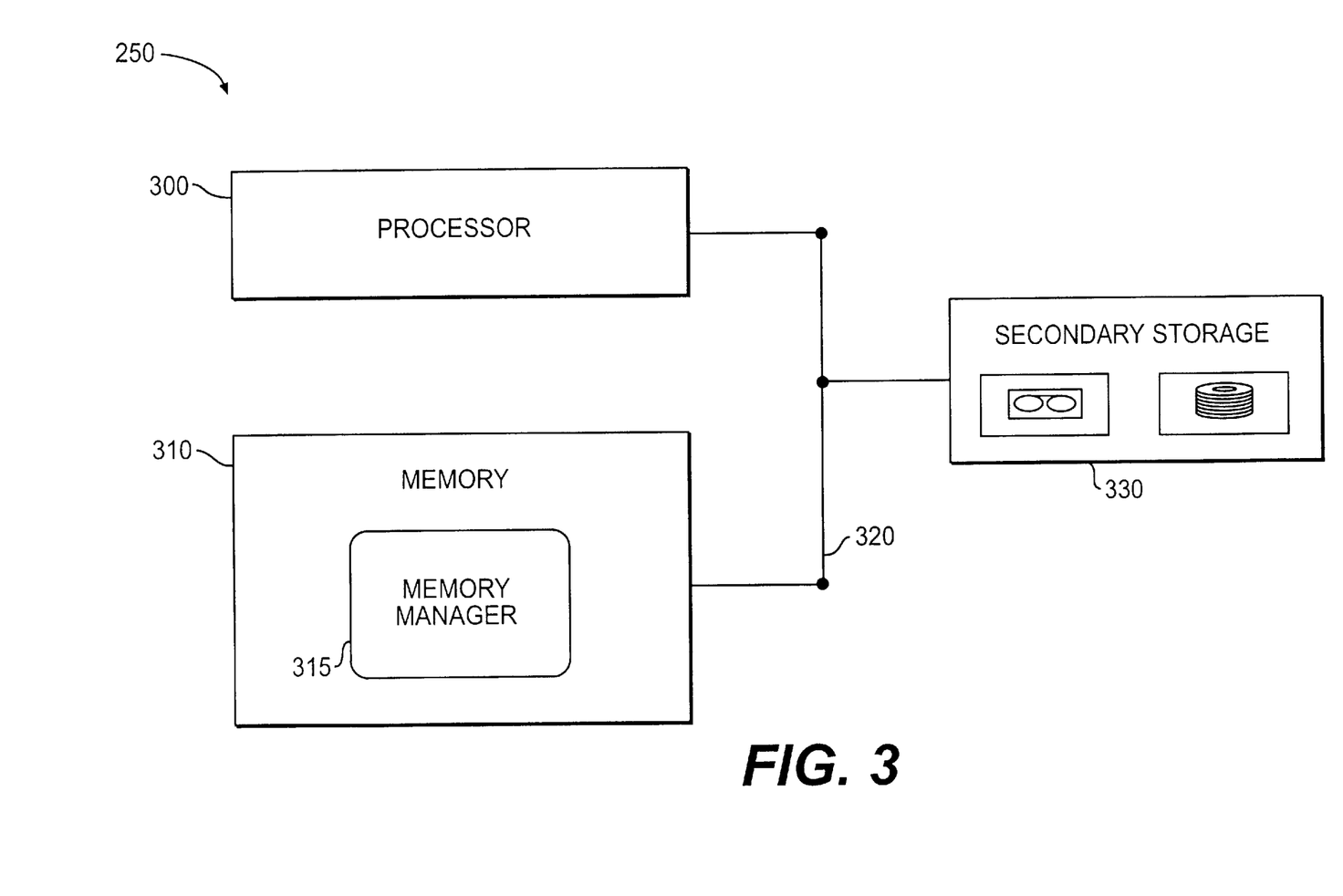
FIG. 3 is a block diagram of a memory management module in a node in accordance with an embodiment of the present invention.

FIG. 3 is a block diagram of memory management 250 in accordance with an embodiment of the present invention. Memory management 250 comprises a processor 300 connected via bus 320 to a memory unit 310 and a secondary storage device 330. Memory 310 comprises a memory manager program 315, which includes instructions in the form of software that processor 300 executes. Alternatively, the functionality of memory manager as described herein may be implemented in hardware using, for example, Application Specific Integrated Circuit (ASIC).

Secondary storage 330 comprises a computer readable medium such as a disk drive and/or a tape drive. From the tape drive, software and data may be loaded onto the disk drive, which can then be copied into memory 310. Similarly, software and data in memory 310 may be copied onto the disk drive, which can then be loaded onto the tape drive.

MEMORY MANAGER PROGRAM

Figure 4:
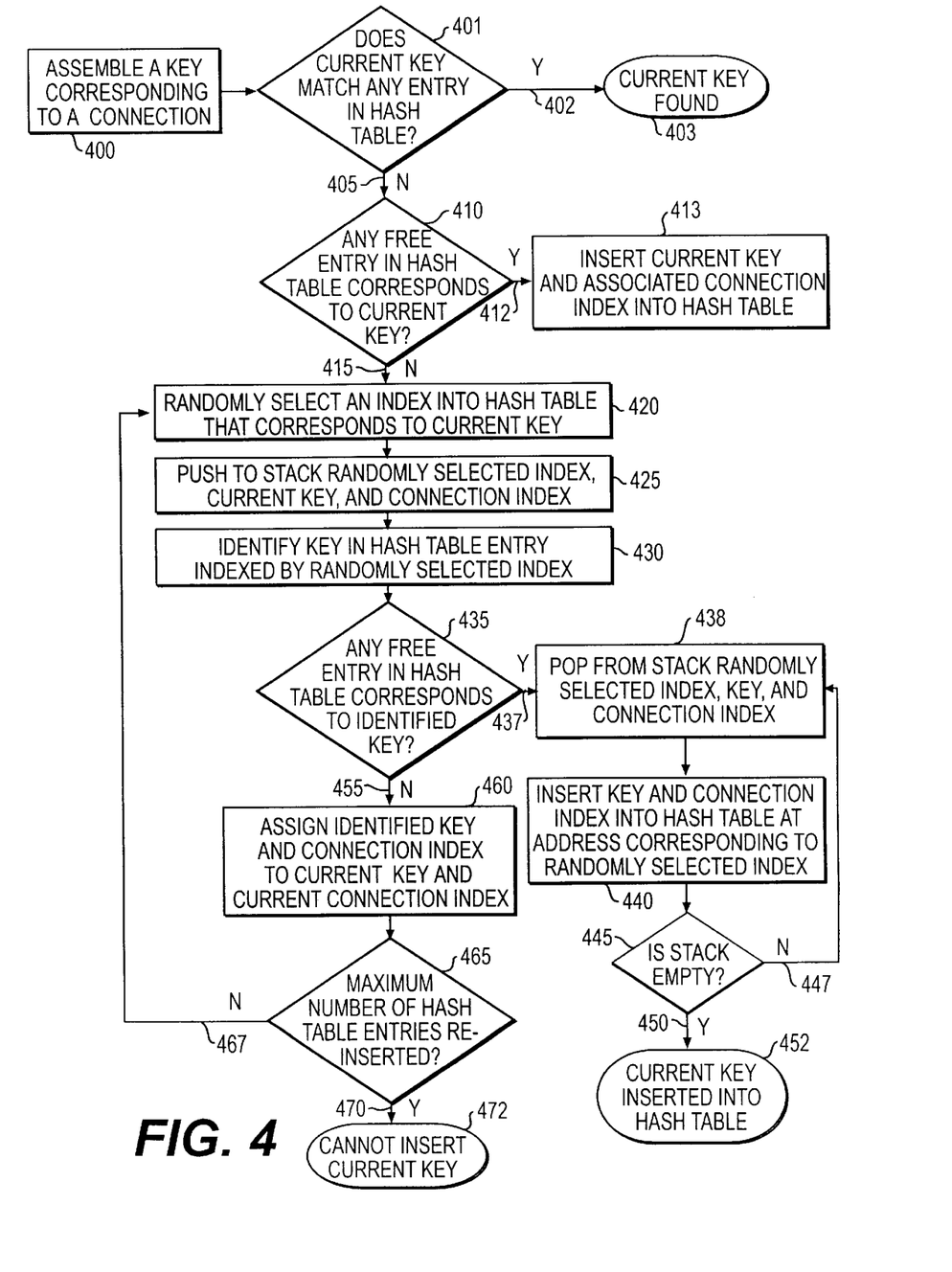
FIG. 4 is a flow chart of the steps performed by a memory management module in accordance with an embodiment of the present invention.

FIG. 4 is a flow chart of the steps performed by memory manager program 315 in accordance with an embodiment of the present invention. When a higher-level routing system in the network requests the establishment of a connection, memory manager 315 assembles a connection identifier (a key), which identifies a particular connection, for example a virtual circuit or a virtual path, associated with the cell (step 400). Memory manager 315 may assemble the connection identifier from the information included in the cell header, for example a virtual connection identifier, a virtual path identifier, and/or an identifier associated with input link $105_{1_1}$. Memory manager 315 determines whether the assembled connection identifier matches an entry in hash table 242 (step 401). When the connection identifier matches an entry in hash table 242 (step 402), memory manager 315 determines that the received cell is associated with a connection whose associated state information is stored in connection table 244 at a location indexed by a connection index in the matching hash table entry (step 403).

When the connection identifier does not match the entries in hash table 242 within a predetermined probe threshold (step 405), memory manager 315 determines whether the connection identifier corresponds to a free entry in hash table 242 (step 410). If the connection identifier corresponds to a free entry in hash table 242 (step 412), memory manager 315 inserts the connection identifier and its associated connection index into hash table 242 (step 413).

When the connection identifier does not correspond to a free entry in hash table 242 (step 415), memory manager 315 randomly selects an index into hash table 242 that corresponds to the connection identifier (step 420). Memory manager 315 then pushes into a stack maintained in memory 310, the randomly selected index, the connection identifier, and its associated connection index (step 425). Memory manager 315 retrieves the entry in hash table 242 that corresponds to the randomly selected index, and identifies the connection identifier in the retrieved hash table entry (step 430).

Memory manager 315 determines whether the identified connection identifier corresponds to a free entry in hash table 242 (step 435). If the identified key corresponds to a free entry in hash table 242 (step 437), memory manager 315 pops from the stack the randomly selected index and its corresponding connection identifier and connection index (step 438). Memory manager 315 inserts the connection identifier and the connection index from the stack into hash table 242 at an address corresponding to the randomly selected index (step 440).

Memory manager 315 then determines whether the stack is empty (step 445). If the stack is not empty (step 447), memory manager 315 pops from the stack the next randomly selected index and its corresponding connection identifier and connection index (step 438) and repeats steps 438–445. When the stack is empty (step 450), memory manager 315 has inserted the connection identifier that is assembled in step 400 into hash table 242 (step 452).

When the identified connection identifier does not correspond to a free entry in hash table 242 (step 455), memory manager 315 assigns the identified connection identifier and its associated connection index to be the current key and the current connection index (step 460). While the number of entries in hash table 242 reinserted by memory manager 315 are less than a predetermined reinsert threshold (step 465), memory manager 315 repeats steps 420 through 476 by, for example, recursively performing these steps (step 467).

When memory manager 315 determines that the number of entries in hash table 242 reinserted equals the predetermined reinsert threshold (step 470), it determines that the connection identifier assembled in step 400 cannot be inserted into hash table 242.

MEMORY SEARCH MODULE

Figure 5:
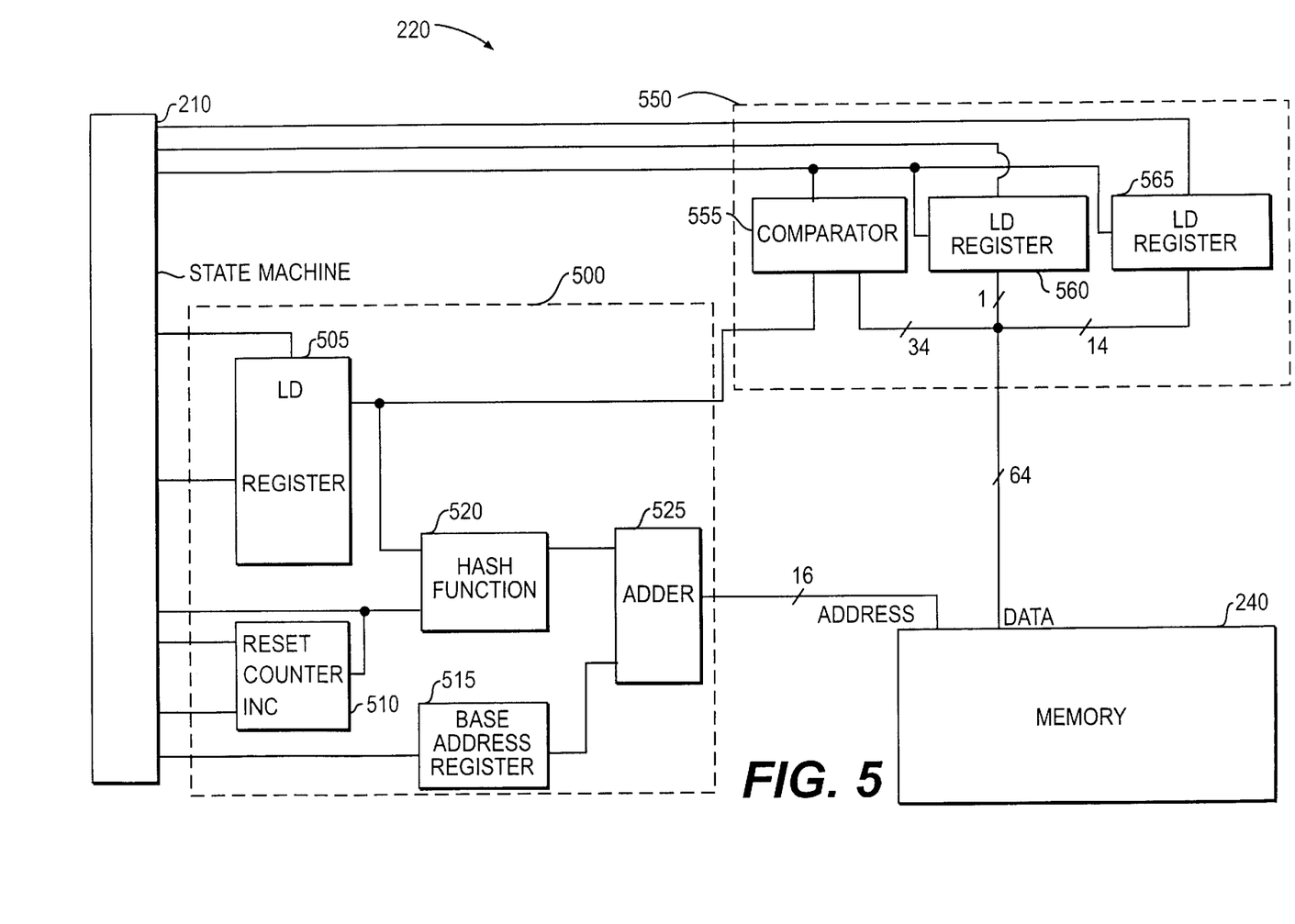
FIG. 5 is a block diagram of a memory search module in a node in accordance with an embodiment of the present invention.

When memory search 220 receives via state machine 210 a specific connection identifier from memory manager 315, memory search 220 retrieves from hash table 242 an entry whose address corresponds to the connection identifier. FIG. 5 is a block diagram of memory search 220 in accordance with an embodiment of the present invention. As shown, memory search 220 comprises a memory addresser 500 and an entry selector 550.

Memory addresser 500 comprises a key register 505, probe counter 510, base address register 515, hash function module 520, and an adder 525. Key register 505, probe counter 510, and base register 515 are controlled by state machine 210. Key register 505 loads a connection identifier received from state machine 210 when a load signal is turned high by state machine 210. Hash function 520 receives outputs of key register 505 and probe counter 510, and determines a hash value using, for example, a Cyclical Redundancy Code function. Adder 525 adds the outputs of hash function 520 and base address register 515 for determining an address into hash table 242.

Entry selector 550 comprises a comparator 555, and registers 560 and 565. Comparator 555 compares the output of key register 505 with the connection identifier in an entry in hash table 242, which is addressed by memory addresser 500. Based on load signals received from state machine 210, registers 560 and 565 also load a connection type indicator and a connection index, respectively, from the entry in hash table 242 addressed by memory addresser 500.

Figure 6:
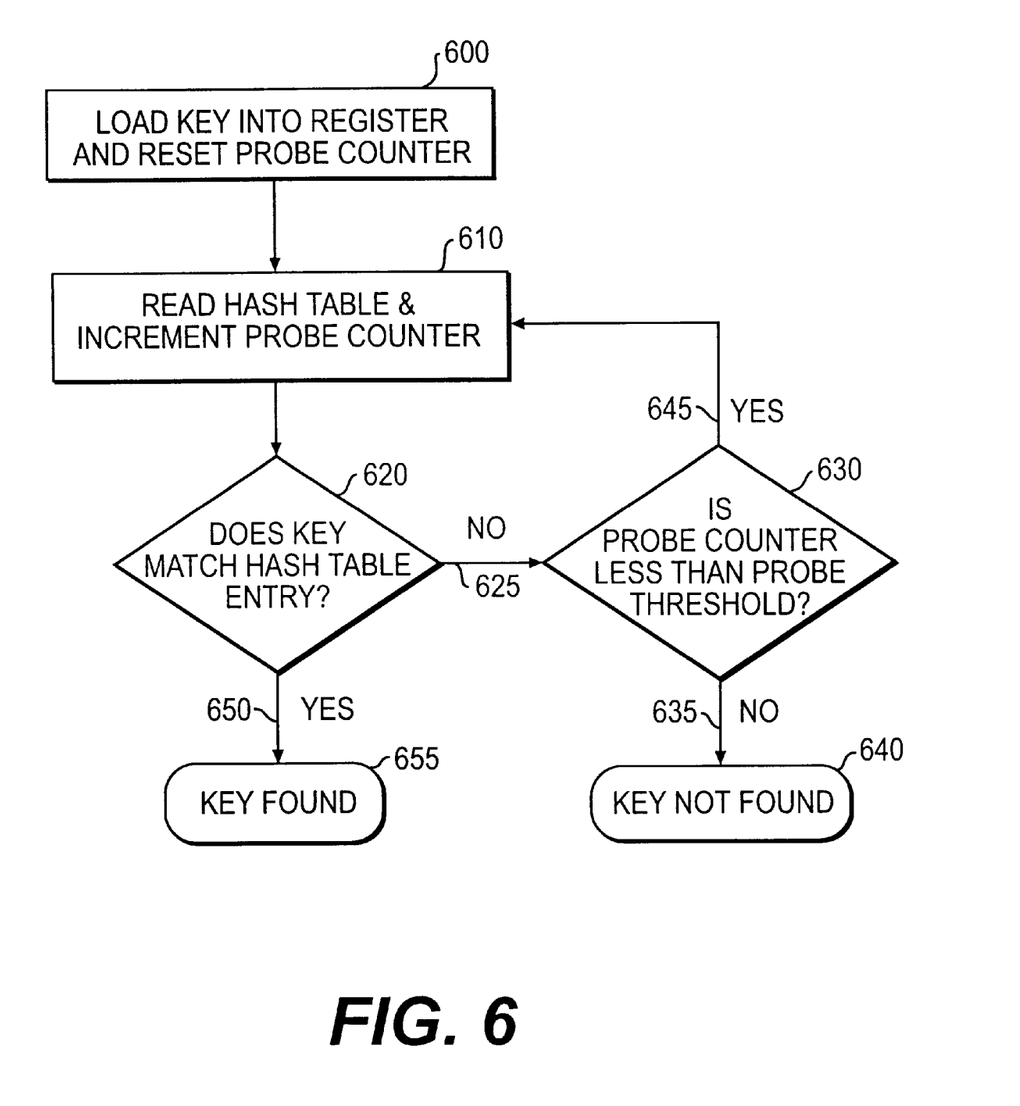
FIG. 6 is a flow chart of the steps performed by a memory search module and a state machine in a node in accordance with an embodiment of the present invention.

FIG. 6 is a flow chart of the steps performed by memory search 220 and state machine 210 in accordance with an embodiment of the present invention. State machine 210 loads a connection identifier into key register 505, resets probe counter 510, and loads a base address into base address register 515 (step 600). Memory addresser 500 then retrieves from hash table 242 an entry that corresponds to the connection identifier loaded into key register 505, and state machine 210 increments probe counter 510 via the increment (INC) terminal in probe counter 510 (step 610). Specifically, hash function 520 determines a hash value based on the connection identifier in key register 505 and the count of probe counter 510. Adder 525 adds the outputs of hash function 520 and base address register 515 to determine the address of an entry in hash table 242.

Entry selector 550 determines whether the addressed hash table entry matches the connection identifier in key register 505 (step 620). Specifically, comparator 555 compares output of key register 505 with the connection identifier in the entry addressed by memory addresser 500. If the connection identifier in key register 505 matches the addressed entry, comparator 555 produces a high output (step 650), and state machine 210 determines that the addressed entry in hash table 242 includes a connection identifier that matches the connection identifier in key register 505 (step 655). If the connection identifier in key register 505 does not match the addressed entry (step 625), state machine 210 determines whether the count in probe counter 510 is less than a predetermined probe threshold (step 630). If the count equals the predetermined probe threshold (step 635), state machine 210 determines that the connection identifier in key register 505 does not correspond to an entry in hash table 242 (step 640).

If the count is less than the predetermined probe threshold (step 645), memory addresser 500 retrieves from hash table 242 another entry using a different hash value and repeats steps 610 through 630. Since in each iteration of steps 610–630 state machine 210 increments probe counter 510, hash function 520 generates a different hash value for addressing hash table 242. When the connection identifier in key register 505 matches an addressed entry (step 650), state machine 210 returns the connection identifier, connection type indicator, and the connection index in the addressed entry to memory manager 315.

MEMORY INSERT MODULE

Figure 7:
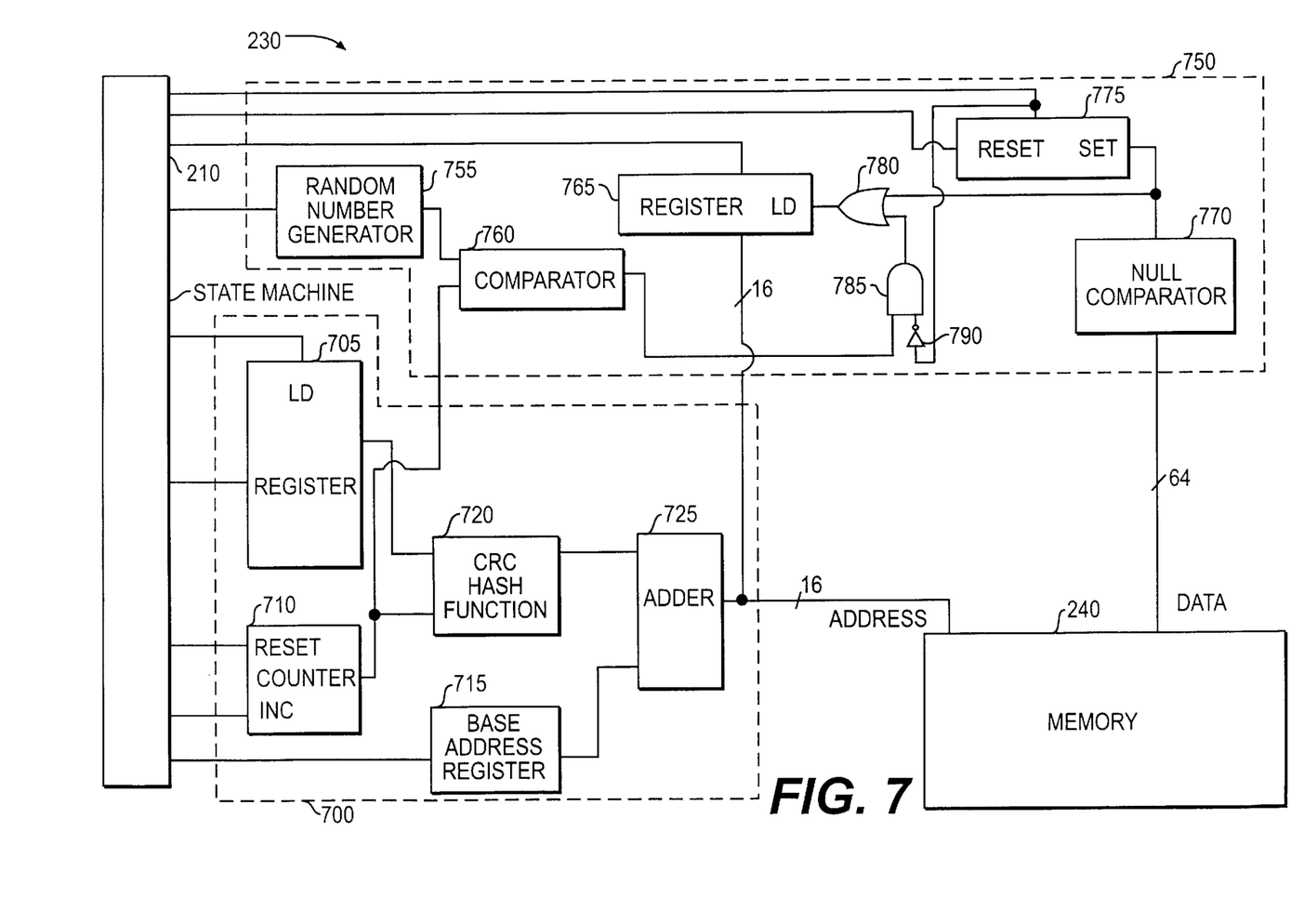
FIG. 7 is a block diagram of a memory insert module in a node in accordance with an embodiment of the present invention.

When memory insert 230 receives a specific connection identifier from state machine 210, memory insert 230 identifies in hash table 242 a free entry whose memory address corresponds to the connection identifier. FIG. 7 is a block diagram of memory insert 230 in accordance with an embodiment of the present invention. As shown, memory insert 230 comprises memory addresser 700 and a free entry selector 750.

Memory addresser 700 comprises a key register 705, probe counter 710, base address register 715, hash function module 720, and adder 725. Key register 705, probe counter 710, and base register 715 are controlled by state machine 210. Key register 705 loads a connection identifier received from state machine 210 when a load signal is turned high by state machine 210. Hash function 720 receives outputs of key register 505 and probe counter 710, and determines a hash value using, for example, a Cyclical Redundancy Code function. Adder 725 adds the outputs of hash function 720 and base address register 715 for determining an address into hash table 242.

Free entry selector 750 comprises random number generator 755, comparator 760, register 765, null comparator 770, Set-Reset register 775, OR gate 780, AND gate 785, and inverter 790. Null comparator 770 receives an entry from hash table 242 in memory 240, and generates a high signal when the entry is null. Set-Reset register 775, which receives the output of null comparator 770, connects to inverter 790 and state machine 210. Comparator 760 compares outputs of random number generator 755 and probe counter 710, and generates a signal, which is received by AND gate 785. AND gate 785 receives the output of comparator 760 and inverter 790, and generates a signal, which is received by OR gate 780. OR gate 780 also receives the output of null comparator 770, and generates a signal that controls the load terminal in register 765. Register 765 stores the output of adder 725, which state machine 210 returns to memory manger 315.

Figure 8:
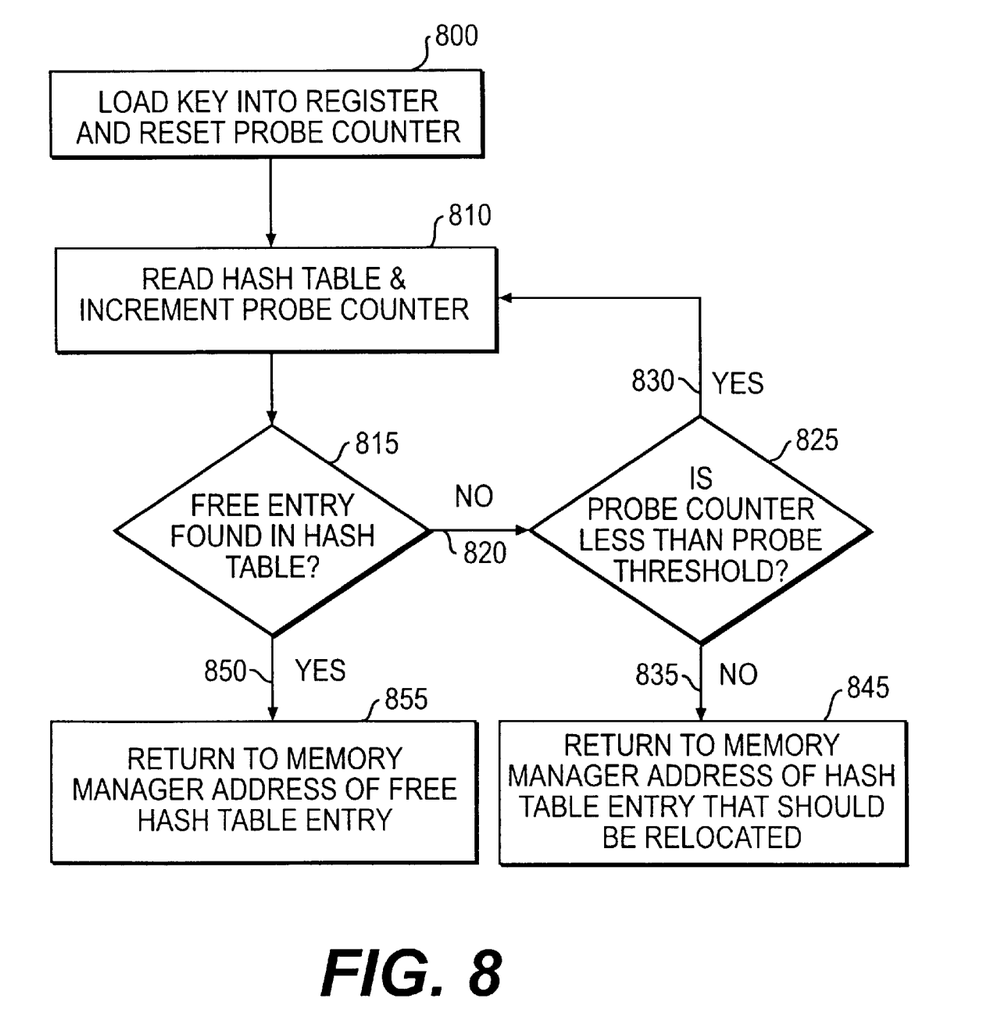
FIG. 8 is a flow chart of the steps performed by a memory insert module and a state machine in a node in accordance with an embodiment of the present invention.

FIG. 8 is a flow chart of the steps performed by memory insert 230 and state machine 210 in accordance with an embodiment of the present invention. State machine 210 loads a connection identifier into key register 705, resets probe counter 710, and loads a base address into base address register 715 (step 800). Memory addresser 700 then retrieves from hash table 242 an entry that corresponds to the connection identifier loaded into key register 705. State machine 210 increments probe counter 710 via the increment (INC) terminal in probe counter 710 (step 810). Specifically, hash function 720 determines a hash value based on the connection identifier in key register 705 and the count of probe counter 710. Adder 725 adds the outputs of hash function 720 and base address register 715 to determine the address of an entry in hash table 242.

Free entry selector 750 determines whether the addressed entry in hash table 242 is free (step 815). Specifically, when the addressed entry is null (step 850), comparator 770 generates a high signal, which sets Set-Reset register 775 to high. In addition, as a result of the null comparator 770 output, OR gate 780 generates a high signal, which loads output of adder 725 into register 765. The output of Set-Reset register 775 causes state machine 210 to return to memory manager 315 the address stored in register 765.

When the addressed entry in hash table 242 is not null (step 820), state machine 210 determines whether the count of probe counter 710 is less than a predetermined probe threshold (step 825). If the count of probe counter 710 equals the predetermined probe threshold (step 835), state machine 210 returns to memory manager the address of a randomly selected entry in hash table 242 that memory manager must relocate in hash table 242 (step 845). Specifically, when the count in probe counter 710 matches the output of random number generator 755, comparator 760 generates a high signal. Since the addressed entry in hash table 242 is not null, the output of null comparator 770 is low, causing the output of inverter 790 to go high. Because the outputs of comparator 760 and inverter 790 are high, AND gate 785 generates a high signal, which causes the output of adder 725 to be loaded into register 765. State machine 210 then returns the address loaded into register 765 to memory manager 315.

If the count in probe counter 710 is less than the predetermined probe threshold (step 830), memory addresser 700 retrieves from hash table 242 another entry using a different hash value and repeats steps 810 through 825. Since in each iteration of steps 810-825 state machine 210 increments probe counter 710, hash function 720 generates a different hash value for addressing hash table 242. When the connection identifier in key register 705 corresponds to a free entry in hash table 242 (step 850), state machine 210 returns to memory manager 315 the address of the free entry, which is stored in register 765 (step 855).

Those skilled in the art will recognize that various modifications and variations can be made in the preceding examples without departing from the scope or spirit of the invention. The specification does not limit the invention. Instead, it provides examples and explanations to allow persons of ordinary skill to appreciate different ways to practice this invention. The following claims define the true scope and spirit of the invention.

What is claimed is:

1. A method for retrieving connection information from a memory, said method comprising the steps of:

determining a first connection identifier for retrieving the connection information;

identifying a first address in the memory corresponding to the first connection identifier;

retrieving from the first address a first entry that includes a second connection identifier; and identifying a second address in the memory corresponding to the first connection identifier and retrieving at the second address a second entry when the first connection identifier does not match the second connection identifier.

2. The method of claim 1 further comprising the steps of:

retrieving the connection information from the first entry when the first connection identifier matches the second connection identifier.

3. The method of claim 1 further comprising the steps of:

retrieving the connection information from the second entry when the first connection identifier matches a third connection identifier in the second entry.

4. The method of claim 1 further comprising the steps of:

retrieving the connection information from a third address in the memory corresponding to a connection index in the first entry when the first connection identifier matches the second connection identifier.

5. The method of claim 1 further comprising the steps of:

determining a count of the first and the second addresses; and determining that the connection information does not exist in the memory when the count equals a predetermined threshold.

6. The method of claim 1, wherein the step of identifying the first address comprises the substep of:

determining a hash value based on the first connection identifier.

7. A method for storing connection information in a memory, said method comprising the steps of:

determining a first connection identifier for storing the connection information;

identifying a first set of addresses in the memory corresponding to the first connection identifier;

randomly selecting one of the first set of addresses when each of the first set of addresses is full;

identifying a second connection identifier in an entry at the randomly selected one of the first set of addresses;

inserting the second connection identifier at a free one of a second set of addresses corresponding to the second connection identifier; and inserting the first connection identifier at the randomly selected one of the first set of addresses.

8. The method of claim 7 further comprises the steps of:

determining a count of the first connection identifier and the second connection identifier; and determining that the connection information cannot be stored in the memory when the count equals a predetermined threshold.

9. The method of claim 7, wherein said step of identifying the first set of addresses comprises the substep of:

determining a set of hash values, respectively, based on the first connection identifier.

10. A system for retrieving connection information from a memory, comprising:
- a memory addresser for identifying an address corresponding to a first connection identifier in the memory;
- an entry selector for selecting an entry at the identified address when the entry includes a second connection identifier that matches the first connection identifier; and
- a state machine for invoking the memory addresser and the entry selector when the second connection identifier does not match the first connection identifier.

11. The system of claim 10, wherein the memory addresser comprises:
- a counter for counting the number of retrieves from the memory by the memory addresser;
- a hash function module for generating a hash value based on the first connection identifier and a count of the counter.

12. A system for storing connection information in a memory, comprising:
- a memory addresser for identifying a first set of addresses corresponding to a first connection identifier in the memory;
- a free entry selector for randomly selecting one of the first set of addresses when each of the first set of addresses is full; and
- a memory manager for identifying a second connection identifier at the randomly selected one of the first set of addresses and for inserting the second connection identifier at a free one of a second set of addresses corresponding to the second connection identifier and inserting the first connection identifier at the randomly selected one of the first set of addresses when each of the first set of addresses is full.

13. The system of claim 12, wherein the memory addresser comprises:
- a counter for counting the number of the first set of addresses;
- a hash function module for generating a hash value based on the first connection identifier and the count of the counter.

14. The system of claim 13, wherein the free entry selector comprises:
- a number generator for generating a random number; and
- a comparator for comparing the generated random number with the count of the counter such that one of the first set addresses is randomly selected.

* * * * *